May 5, 1970 R. E. BERNERT ET AL 3,509,622

METHOD OF MANUFACTURING COMPOSITE SUPERCONDUCTIVE CONDUCTOR

Filed Sept. 28, 1967 2 Sheets-Sheet 1

ROBERT E. BERNERT
AHMED EL BINDARI
INVENTOR.

BY Charles M. Hogan
Melvin E. Frederick
ATTORNEYS

METHOD OF MANUFACTURING COMPOSITE SUPERCONDUCTIVE CONDUCTOR

Filed Sept. 28, 1967

FIELD KILOGAUSS

TYPICAL DATA

ROBERT E. BERNERT
AHMED EL BINDARI
INVENTOR.
BY Charles M. Hogan
Melvin E. Frederick
ATTORNEYS United States Patent Office 3,509,622
Patented May 5, 1970

3,509,622

METHOD OF MANUFACTURING COMPOSITE SUPERCONDUCTIVE CONDUCTOR

Robert E. Bernert, Boxford, and Ahmed ElBindari, Cambridge, Mass., assignors to Avco Corporation, Cincinnati, Ohio, a corporation of Delaware Filed Sept. 28, 1967, Ser. No. 671,399
Int. Cl. H01v *11/08*
U.S. Cl. 29—599 4 Claims

ABSTRACT OF THE DISCLOSURE

A method of fabrictating a composite superconductive conductor wherein a billet comprising superconductive material disposed in a normal metal is cold reduced as by drawing or rolling to a final configuration, during which procedure the billet is annealed at various times and heat treated after it has been highly cold reduced.

"Hard" superconductors, such as, for example, NbTi, $Nb_3Sn$, $Nb_3Sb$, $Nb_3Al$, $V_3Si$, $V_3Ga$ and the like, find wide use in the production of intense magnetic fields. The advantage of a "hard" superconductor is that it remains supperconductive in the presence of intense magnetic fields. By way of example, others have observed superconductivity in $Nb_3Sn$ at average current densities exceeding 100,000 amperes/cm.$^2$ in magnetic fields as large as 88 kilogauss. Whereas $Nb_3Sn$ has a critical temperature of 18.5° K. (it reverts to the normal state if its temperature exceeds 18.5° K), Nb and Sn both have critical temperatures less than 12° K. Further, whereas both Nb and Sn have sufficient ductility to be drawn or plastically deformed, $Nb_3Sn$ has substantially no plastic deformation characteristics.

It has been suggested that superconducting wires be fabricated by techniques such as filling a niobium tube with niobium and aluminum powder, niobium and tin powder, etc., drawing the niobium tube to form the wire and then sintering the wire to form an integral core of superconductive material. Alternatively, vapor-phase reactions on the surface of a wire or substrate have been used. In any case, the resulting wire with the exception of vapor-phase reactions deposited on a flexible substrate and thereafter covered with a thin coat of normal metal (one which does not lose all resistance at the temperature of application) is brittle and difficult to fabricate in extreme lengths without flaws. A single flaw in a resulting winding can destroy the usefulness of the solenoid since, at some low value of current, that portion of the winding will revert to the normal state which is to say become resistive. Resultant $I^2R$ heating will then propagate a thermal wave into the remainder of the solenoid, destroying the device if total stored energies are sufficiently high.

Prior art efforts to minimize the difficulties presented by the brittleness of superconductive materials, such as $Nb_3Sn$, is discussed in the technical literature in considerable detail as is also the fabrication and characteristics of such materials. See, for example, Physical Review Letters, vol. 6, No. 3, pp. 89–91, Feb. 1, 1961, and Metallurgy of Advanced Electronic Materials published by Interscience Publishers 1963, pp. 3–171.

Superconducting coils comprising $Nb_3Sn$ requiring heat treatment in accordance with the prior art teaching are subject to serious disadvantages. In the first place, such superconducting wire which requires the above-noted heat treatment after a composite billet has been drawn to form wire of the desired diameter, cannot be tested to determine its superconductive characteristics until after the coil has been completed. Obviously, if such wire is inherently defective, this can be determined only at the most inopportune time, i.e., after the expense of fabricating an unsatisfactory coil has been incurred.

Most electromagnetic coils of high quality have been wound from niobium-zirconium alloy wire. This niobium-zirconium alloy wire must be hot worked initially and annealed at least once in the course of cold working to maintain the material in a workable condition. Further, niobium-zirconium wire employs a relatively high proportion of niobium therein and is consequently very expensive.

The niobium-titanium system is a superconductive alloy system which possesses several characteristics which are attractive for superconductor applications. First, the critical temperature is above 9.0° K. for binary niobium-titanium alloy containing from 0 to approximately 60 atom percent titanium. Second, the resistive critical field at 4.2° K. is approximately 120 kilogauss. Third, titanium is a relatively cheap and abundant alloy component.

Irrespective of whether the composite superconductive conductors referred to hereinabove are of the $Nb_3Sn$ type requiring heat treatment after fabrication, the NbZR type, or are of the vapor-phased deposited thin film type, they do not lend themselves to manufacturing techniques comprising heavy cladding which eliminate the necessity of means such as protective circuitry to protect the coil in the event it goes normal during use. Thus, as it well known now, if a superconductive magnet coil formed of superconductive wire alone goes normal, the resistance introduced causes the creation of forces and/or the generation of heat that may destroy the coil. Accordingly, protective circuitry may be provided to protect the coil or alternatively, the superconductive material may comprise part of a composite conductor as, for example, by being embedded in a relatively massive ribbon of low resistance normal material. The provision of such a composite conductor permits the elimination of the aforementioned protective circuitry which would otherwise be necessary. For a more complete discussion of suitable protective circuitry, reference is made to U.S. Patent No. 3,263,133 and for a more complete discussion of suitable composite conductors not requiring protective circuitry, reference is made to U.S. patent applications Ser. Nos. 600,356 filed Nov. 23, 1966, and 383,392 filed July 17, 1964, now Patent No. 3,372,479.

In accordance with the principles of the present invention, the abovementioned disadvantages and limitations can be substantially minimized if not completely eliminated while at the same time substantially reducing not only the complexity and difficulty but principally the cost of manufacturing superconductive conductors and superconductive coils which do not require special means to protect them in the event that they go normal.

It is a principal object of the present invention to provide improved techniques for fabricating superconductive conductors.

Another object of the present invention is to provide a simple and low cost method of fabricating composite souperconductive conductors.

A further object of the present invention is to provide a method of making a conductor comprising a normal material and a superconducting material.

A still further object of the present invention is to provide a method of making a conductor comprising a normal material and superconducting material wherein the contact resistance between the superconducting material and the normal material is not substantially measurably greater than the resistance of the normal material.

Another object of the present invention is to provide a method of fabricating flexible composite superconductive conductor comprising a superconductive material in direct thermal and electrical contact with a normal metal.

A still further object of the present invention is to provide improved technique for fabricating composite conductors which do not require protective circuitry to protect it when formed into a magnet coil.

A still further object of the present invention is to provide an improved method of fabricating a stabilized composite superconductive conductor having a high critical field and a high critical super-current density in strong applied magnetic fields of a magnitude approaching that of the critical field.

The novel features that are considered characteristic of the invention are set forth in the appended claims; the invention itself, however, both as to its organization and method of operation, together with additional objects and advantages thereof, will best be understood from the following description of a specific embodiment, when read in conjunction with the accompanying drawings, in which:

Figure 1:
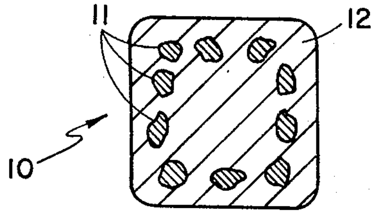
FIGURE 1 is a greatly enlarged sectional end view of an essentially square conductor in accordance with the present invention.

Referring now to FIGURE 1, there is shown by way of example a multi-core composite superconductive conductor, generally designated by the numeral 10, comprising ten superconductive filaments 11 extending the length of the conductor. The superconductive filaments 11 are spaced one from another near the periphery of the conductor and embedded in a normal metal 12 having a generally square configuration. The edges of the conductor are rounded to eliminate burrs. The normal metal 12 should be a good electrical conductor such as, for example, copper, aluminum, silver, gold, cadmium and the like. The conductor 10 of FIGURE 1 may, for example, be 0.08 inch square whereas the strip or ribbon-type conductor shown in FIGURE 2 may be, for example, 0.50 inch wide and 0.10 inch thick but otherwise the same as the conductor in FIGURE 1.

Figure 3:
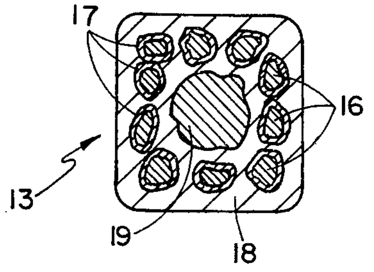
FIGURE 3 is a greatly enlarged sectional end view showing details of a modification of the conductor of FIGURE 1.
Figure 2:
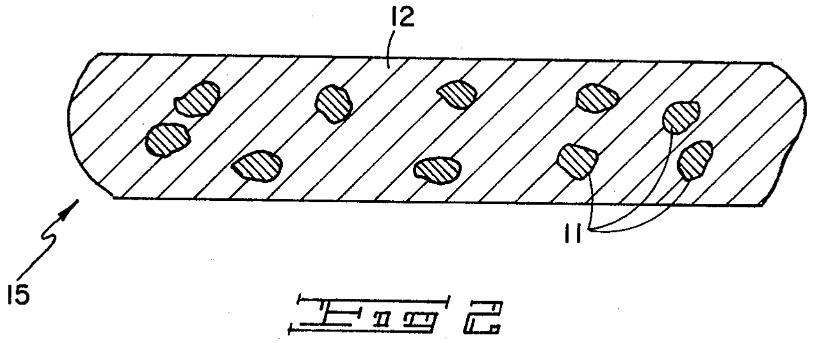
FIGURE 2 is a greatly enlarged sectional end view of a conductor similar to that of FIGURE 1 but having an essentially rectangular cross section.
Figure 4:
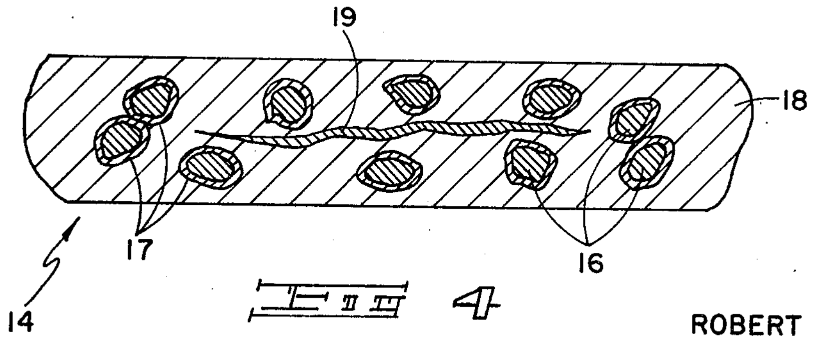
FIGURE 4 is a greatly enlarged sectional end view showing details of a modification of the conductor of FIGURE 3.

Directing attention now to FIGURE 3 and FIGURE 4, it will be noted that the conductors 13 and 14 shown respectively in these figures are quite similar to conductors 10 and 15 shown respectively in FIGURE 1 and FIGURE 2. However, it is important to note that in both FIGURE 3 and FIGURE 4 the superconductive filaments 16 are provided with a thin but integral metal coating 17 which is in turn fully embedded in a separate metal 18. In the case of FIGURE 3, the superconductive filaments 16 with normal metal coating 17 surround an inner core of normal metal 19. In FIGURE 3 and FIGURE 4, the metals 17, 18 and 19 are preferably high purity copper (having a resistivity ratio of about 150 to 1) which is preferred over aluminum, for example, because of its reduced tendency as compared to aluminum to form electrically nonconductive oxide coatings on its surfaces.

While the superconductive material per se prior to drawing forms no part of the invention, it must have sufficient ductility to be drawn with copper. As used herein, the term "drawn" includes rolling, drawing and the like which results in cold reduction. A brief discussion of a suitable superconductive material, such as niobium-titanium alloy and its formation at this point will be helpful. A superconductive material having satisfactory ductile characteristics, such as, for example, a niobium-40% titanium alloy with small amounts of incidental impurities may be prepared by vacuum arc melting a composite electrode composed of 60 parts by weight of electron beam melted niobium (99.90% niobium) and 40 parts by weight of arc-melted titanium (99.35% titanium). The vacuum-arc melted ingot after formation may be machined to remove surface roughness and imperfections. The ingot may then be homogenized in a temperatur range 1400°–1800° C. in vacuum of less than $10^{-4}$ mm. Hg. for a period of several hours. After homogenization the ingot may be cold forged to a slab or rods having the desired dimensions.

In practice it has been found satisfactory to fabricate in a manner more fully described hereinafter, the composite superconductive conductor to provide a configuration such as shown in FIGURE 1 and FIGURE 3. Ribbon-type conductors as shown, for example, in FIGURE 2 and FIGURE 4 can then be easily and simply provided by rolling conductors having the configuraton as shown in FIGURE 1 and FIGURE 3 to provide a ribbon-type conductor as FIGURE 2 and FIGURE 4 are intended to illustrate.

In accordance with the invention, superconductive composite conductors may be made in the following manner. For fabrication of a single core conductor which will be described first for purposes of simplicity, the starting materials are preferably an integral rod of superconductive material such as, for example, niobium-titanium, and a copper sleeve adapted to receive the rod of superconductive material. For the fabrication of conductors having a useful length, the rod of superconductive material typically may have a diameter of 0.25 inch and a length of about 7 or more feet. The copper sleeve may be typically composed of OFHC copper tubing having a 0.50 inch outside diameter and a 0.30 inch inside diameter and a length at least equal to that of the rod of superconductive material.

Prior to assembly, the mating surfaces of the starting materials must of course be clean and free of foreign material such as tape, dirt, grease and the like. In this respect, the starting materials may be vapor degreased in trichlorethylene vapor and the rod of superconductive material thereafter inserted in the copper sleeve. The copper sleeve may now be swaged or cold reduced onto the rod of superconductive material to place the inner surface of the copper in intimate contact with the outer surface of the rod of superconductive material. If the starting outside diameter of the copper sleeve is as specified above, the finished outside diameter after swaging may typically by 0.44 inch. The composite billet comprising the swaged copper sleeve and rod of superconductive material preferably is now heat treated or annealed in a reducing atmosphere. This initial anneal as well as all intermediate processing anneals (but not including the heat treatment) should be carried out by rapid heating and rapid cooling of the billet. Thus, after swaging as noted above, the composite billet may be annealed at about 1200° F. for between two to ten minutes. It is essential that all anneals prior to the final heat treatment or aging of the conductor be carried out at a temperature and for a time sufficient to at least partially restore ductility and insufficient to substantially permanently affect the superconducting properties of the superconducting material.

After the swaging step, the composite billet may be cold reduced as by rolling, drawing or the like at essentially room temperature to an intermediate size such as, for example, to a diameter of approximately one-fourth to one-third its original diameter. Thus, if subsequent to the swaging step the composite billet has a diameter of approximately 0.44 inch it may now be reduced to approximately 0.130 inch. This may be accomplished, for example, in approximately 18 passes, i.e., the cross section reduction of the composite billet per roll pass should be between 5 and 15 percent. During the aforementioned 5 to 15 percent cross section reductions, depending on the chemical composition and metallurgical condition of the composite billet, it may be desirable or necessary to anneal the composite billet to prevent a substantial reduction in ductility of the metals comprising the billet. If the ratios of ductility are allowed to vary substantially or the ductility of the superconductive material is allowed to decrease substantially, breakage of the superconductive filaments will occur and/or excessive difficulties in processing will be encountered during processing. The present invention is admirably suited to preventing these undesirable conditions in addition to providing a fully stabilized conductor. Thus, in accordance with the invention as noted above, the temperature and time of the anneals prior to the final heat treatment are selected to maintain so far as practically possible the starting ductilities and/or ratios thereof.

Having reached the aforementioned intermediate size, the composite billet may now be given an intermediate anneal at, for example, approximately 1150° F. for between one or two minutes. As previously pointed out, all processing anneals should comprise rapid heating and rapid cooling of the composite billet. If the composite billet is cold reduced as by drawing it through wire drawing dies, rather than rod rolling it, the reduction in cross section need not vary substantially from that specified herein. After the composite billet has been annealed at the intermedaite size, it may then be further cold reduced or drawn to its final size which, for the described conditions and interim size having a diameter of approximately 0.130 inch preferably should be less than 0.060 inch. This last mentioned reduction in cross section is necessary as it has been found that otherwise the annealing at the aforementioned 0.130 inch size may adversely affect the superconducting properties of the superconductive material. Accordingly, in such cases, a cold reduction of cross section by a factor of about four should follow an annealing step.

If the composite billet is to be drawn past 0.060 inch outside diameter final size, additional annealing may be required in order to allow the wire to be drawn to its final size such as, for example, 0.020 inch, 0.010 inch etc. Thus, for the described conditions, after reaching an outside diameter of approximately 0.060 inch, the composite billet should be heat treated each time the cross section is reduced approximately four times, i.e., the composite billet has a cross section of approximately one-quarter of that which it had at the preceding anneal. For example, if the composite billet is annealed at 0.130 inch, it should be annealed again when it has a diameter of approximately 0.650 inch since the cross section at 6.065 inch diameter is approximately one-quarter the cross section of 0.130 inch diameter. The final size of the conductor formed from the composite billet should be approximately one-quarter to one-ninth the cross section it had at the last processing anneal in order to avoid degradation of the superconducting properties of the superconducting material. For cold reductions subsequent to reaching a diameter of 0.060 inch, the anneals, taking into consideration the cross section of the billet, may be substantially the same, i.e., each anneal may, for example, be carried out at a temperature of approximately 1150° F. for one to five minutes.

After the composite billet has been cold reduced to its final size, it is important that it be heat treated for a time and at a temperature sufficient to provide minimum contact resistance and additionally enhance the superconducting properties of the superconductive material, i.e., increase the short sample current carrying capability of the superconductive material over that existing prior to the final heat treatment or aging step. The final heat treatment or aging step is typically done by heat treating or aging the conductor formed from the composite billet at a temperature of about 450° C. and holding it at this temperature for about one to one and one-half hours in a controlled atmosphere furnace or vacuum furnace to protect the outer surface of the wire.

The basic method described hereinabove is appropriate for the fabrication of multi-core conductors as shown in FIGURE 3 and FIGURE 4 with the exceptions or modifications now to be described. Thus, for the fabrication of multi-core conductors in accordance with the invention each starting rod of superconductive material is cleaned, disposed in a cleaned copper sleeve, swaged and annealed as previously described. After the initial annealing step, the composite rods are then cleaned and disposed in a cleaned outer copper sleeve. The outer copper sleeve may have, for example, an outside diameter of 2½ inches and an inside diameter of 1.9 inches. A cleaned solid copper rod may be provided at the center of the outer sleeve if this space is not required for superconductive material or alternately, it is desired to have the superconductive filaments disposed in spaced relationship close to the outer surface of the conductor. If the outer sleeve is provided with a 2½ inches outside diameter and a 1.9 inches inside diameter, fifteen of the single core composite billets previously described (0.044 inch) may be inserted in the outer sleeve to provide a composite billet for producing a multi-core composite conductor. The multi-core composite billet may now be rolled to, for example, approximately 0.50 inch outside diameter, given an intermediate anneal as described previously, rolled to approximately 0.030 inch outside diameter, again given an intermediate anneal and then rolled to a final size of for example 0.10 inch outside diameter. After reaching the final size, the multi-core conductor is then given a heat treatment sufficient to produce interdiffusion of the copper sleeves and insufficient to substantially reduce the short sample current carrying capacity of the conductor prior to the heat treatment.

While it is more difficult and costly than the fabrication techniques just described, because typically drilling or boring to substantial depths are required, conductors as shown in FIG. 1 and FIG. 2 may be fabricated substantially as described by substitution for the copper sleeves of a solid copper billet having passages to receive the superconductive rods.

The processing annealing steps and particularly the final heat treatment or aging step at excessive temperatures for excessive lengths of time must be avoided on penalty of destroying the superconducting characteristics of the wire. The final heat treating or aging step is most advantageously carried out as previously pointed out in vacuo or an inert atmosphere at a temperature and for a period of time sufficient to allow interdiffusion of the metal sleeves surrounding each superconductive filament with the outer sleeve but insufficient to cause diffusion of the metal sleeves into the superconducting material. Within the above limits, the temperature and time of the final heat treatment is selected to produce the greatest possible current carrying capacity in the superconducting material.

Figure 5:
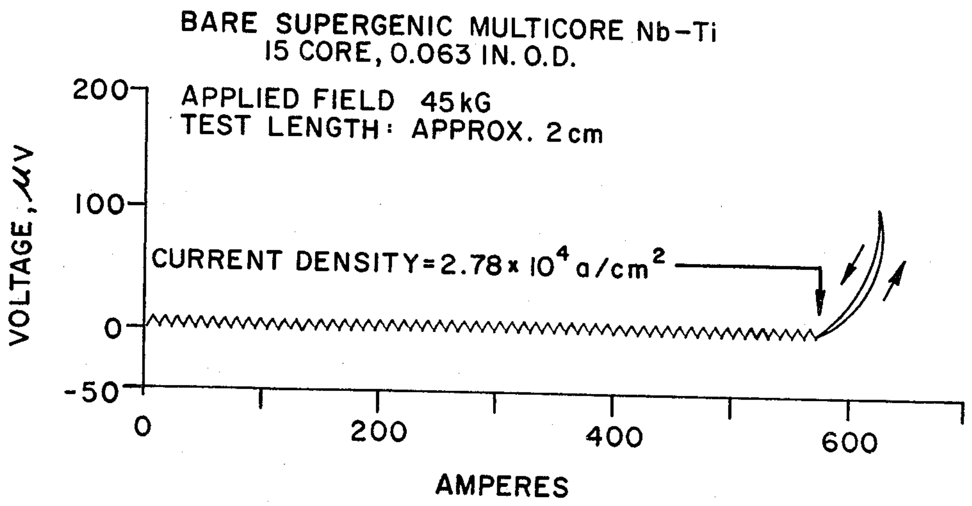
FIGURE 5 is a graphic representation of the short sample performance of a composite conductor having 15 superconductive cores and an outside diameter of 0.063 inch fabricated in accordance with the invention.

FIG. 5 is a graphic representation of the short sample performance of a composite superconductive conductor made in accordance with the invention. Inspection of FIGURE 5 will show that the conductor which comprised a short sample of approximately 2 centimeters of bare conductor having 15 filaments of niobium-titanium and an outer diameter of approximately 0.063 inch in a test field of 45 kg. this conductor had a critical current density of $2.78\times10^4$ amperes per square centimeter and thereafter exhibited stable performance at currents above the critical value. Upon reduction of the current, the resistance dropped until full superconducting performance was reestablished at the point of take-off.

Figure 6:
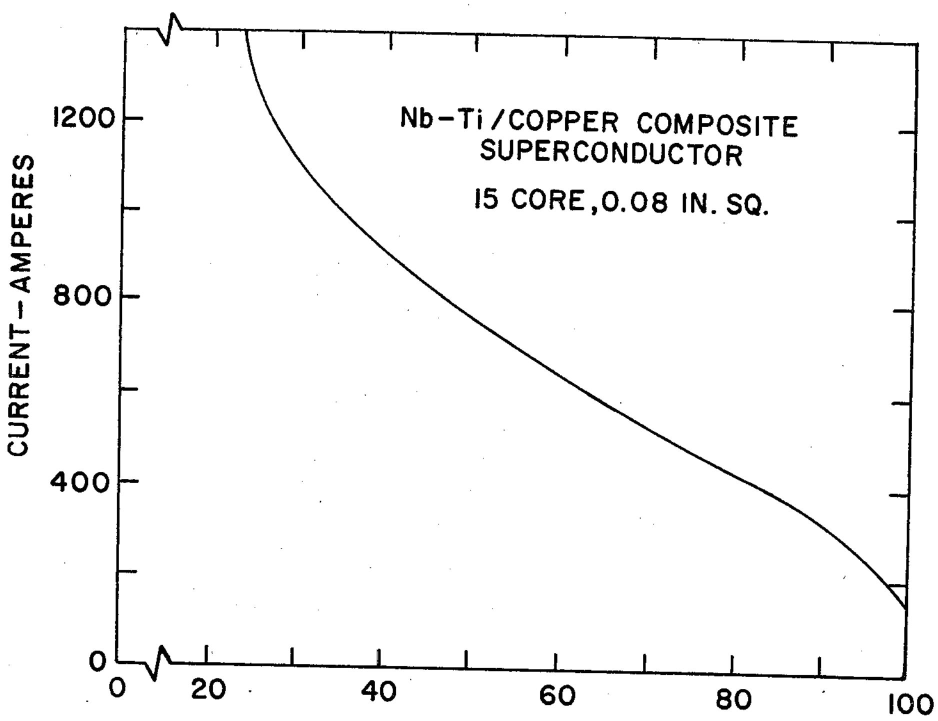
FIGURE 6 is a graphic representation of a 15 core conductor 0.08 inch square and fabricated in accordance with the present invention.

FIG. 6 is a graphic representation of typical performance of another composite superconductive conductor made in accordance with the invention. In this case, the conductor was approximately 0.08 inch square and contained 15 filaments of niobium-titanium.

The various features and advantages of the invention are thought to be clear from the foregoing description. Various other features and advantages not specifically enumerated will undoubtedly occur to those versed in the art as will likewise many variations and modifications of the embodiments illustrated, all of which may be achieved without departing from the spirit and scope of the invention as defined by the following claims:

1. In the method of forming an elongated superconductive composite electrical conductor, the steps comprising:

(a) disposing an integral core of a superconductive alloy of niobium and titanium in a sleeve of normal metal to form a composite billet, said normal metal having a low temperature electrical conductivity of the order of copper at the temperature at which said superconductive material is superconductive;

(b) alternately cold reducing and process annealing said composite billet until its cross section is reduced to its final cross section as an electrical conductor, the cross section of said composite billet being cold reduced by a factor of four after each process annealing step, each said process annealing step being carried out at a temperature of about 1150° F. in the range of about one to about five minutes, said composite billet thereafter being cooled to substantially room temperature; and (c) heat treating said conductor after it has been reduced to its final cross section at a temperature of about 450° C. in the range of about one to about one and one-half hours to increase the short sample current carrying capacity of said superconductive material over that existing prior to said heat treatment.

2. In the method of forming an elongated superconductive composite electrical conductor, the steps comprising:

(a) disposing an integral core of a superconductive alloy of niobium and titanium in respectively a plurality of first sleeves of normal metal;

(b) disposing said first sleeves containing said superconductive material in a second sleeve of normal metal to form a composite billet, said first and second sleeves having a low temperature electrical conductivity of the order of copper at the temperature at which said superconductive material is superconductive;

(c) alternately cold reducing and process annealing said composite billet until its cross section is reduced to its final cross section as an electrical conductor, the cross section of said composite billet being cold reduced by a factor of four after each process annealing step, each said process annealing step being carried out at a temperature of about 1150° F. in the range of about one to about five minutes, said composite billet thereafter being cooled to substantially room temperature; and (d) heat treating said conductor after it has been reduced to its final cross section at a temperature lower than the melting point of said metals for a period of time sufficient to produce interdiffusion of said first and second metals and insufficient to substantially reduce the short sample current carrying capacity of said conductor prior to said heat treatment.

3. The combination as defined in claim 2 wherein the inner surface of each said first sleeve and the outer surface of its core of superconductive material are placed in substantially intimate contact prior to the disposition of said first sleeves in said second sleeve.

4. The combination as defined in claim 3 wherein:

(a) said first and second sleeves are copper having a resistivity ratio (resistivity at room temperature/resistivity at liquid helium temperature) of at least about one hundred fifty to one; and (b) said heat treating step is carried out at a temperature of about 450° C. in the range of about one hour to about one and one-half hours.

References Cited

UNITED STATES PATENTS

| | | | |
|---|---|---|---|
| 3,124,455 | 3/1964 | Buehler et al. | 29—599 |
| 3,215,569 | 11/1965 | Kneip et al. | 29—599 |
| 3,218,693 | 11/1965 | Allen et al. | 29—599 |
| 3,239,919 | 3/1966 | Levi | 29—599 |
| 3,275,480 | 9/1966 | Betterton et al. | |
| 3,029,496 | 4/1962 | Levi | 29—599 |
| 3,162,943 | 12/1964 | Wong | 29—423 |
| 3,370,347 | 2/1968 | Garwin et al. | 29—599 |

FOREIGN PATENTS

| | | |
|---|---|---|
| 1,352,545 | 1/1964 | France. |

PAUL M. COHEN, Primary Examiner

U.S. Cl. X.R.

29—194

PO-1050
(5/69)

UNITED STATES PATENT OFFICE
CERTIFICATE OF CORRECTION

Patent No. 3,509,622 Dated May 5, 1970

Inventor(s) Robert E. Bernert and Ahmed ElBindari

It is certified that error appears in the above-identified patent and that said Letters Patent are hereby corrected as shown below:

Column 2, line 26, for "it" read--is--; Column 2, line 42, for "600,356" read--600,346--; Column 2, line 44, for "3,372,479" read--3,372,470--; Column 4, line 14 for "temperatur" read--temperature--; Column 4, line 14 after "in" read--a--; Column 5, line 55, for "6.065" read--0.065--.

SIGNED AND SEALED DEC 1 - 1970

DEC. 1,1970

(SEAL)
Attest:

Edward M. Fletcher, Jr.
Attesting Officer

WILLIAM E. SCHUYLER, JR.
Commissioner of Patents